Figure 3:
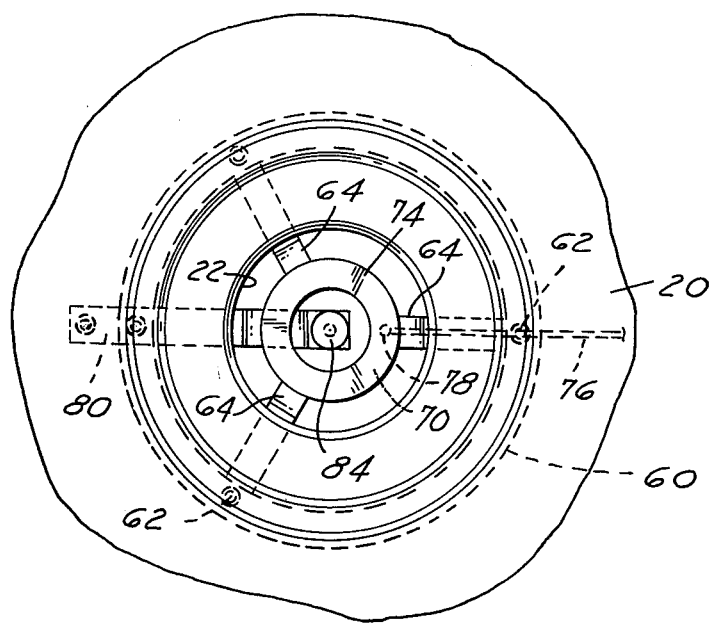

United States Patent [19]

Wegener

[11] 4,125,752
[45] Nov. 14, 1978

[54] COOKING VESSEL TEMPERATURE CONTROL FOR MICROWAVE OVENS

[76] Inventor: Carl J. Wegener, 28106 Hoover Rd., Apt. #4, Warren, Mich. 48093

[21] Appl. No.: 800,182

[22] Filed: May 25, 1977

[51] Int. Cl.² .............................................. H05B 9/06
[52] U.S. Cl. ................................ 219/10.55 E; 99/328; 219/10.55 B
[58] Field of Search ................... 219/10.55 R, 10.55 B, 219/10.55 E, 441, 442, 482, 494, 432, 449, 450, 451; 99/328; 73/362 A

[56] References Cited

U.S. PATENT DOCUMENTS 3,098,918  7/1963  Koci et al. ............................ 219/442
3,934,118  1/1976  Jorgenson et al. .................... 219/442
3,935,415  1/1976  Moore ............................ 219/10.55 E
4,041,266  8/1977  Moore ............................ 219/10.55 E Primary Examiner—Arthur T. Grimley
Attorney, Agent, or Firm—Barnes, Kisselle, Raisch & Choate

[57] ABSTRACT

A temperature control unit for a microwave oven and the like which includes a sensing device mounted in the wall of a vessel to be placed in a microwave oven, for example, and contact elements in the base of said oven to be positioned in registry with contact elements on the sensing device to place the sensing device in a control circuit for the regulation of time and temperature in conjunction with the oven control.

8 Claims, 8 Drawing Figures

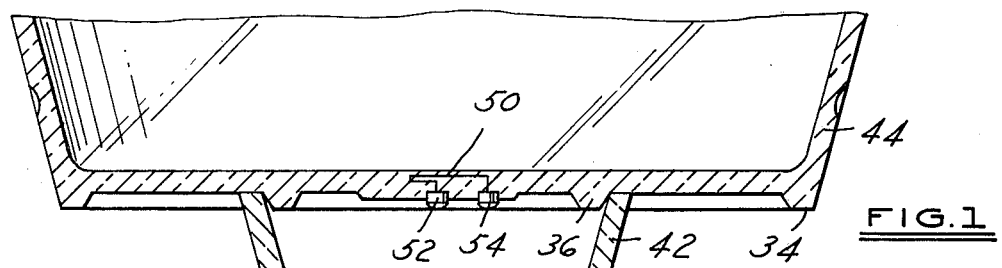
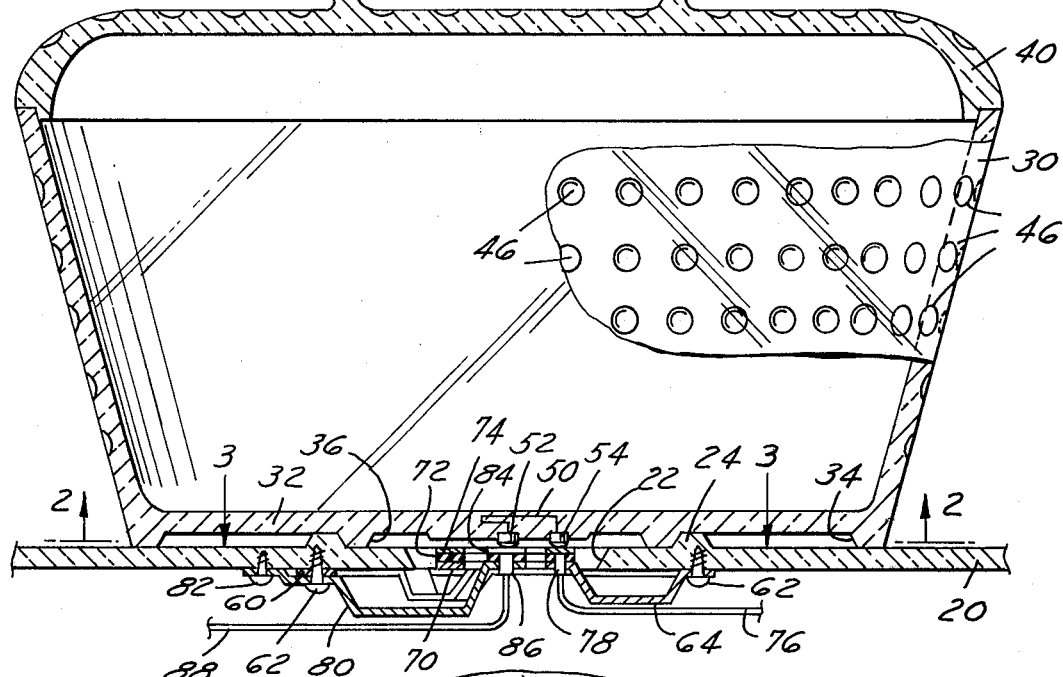
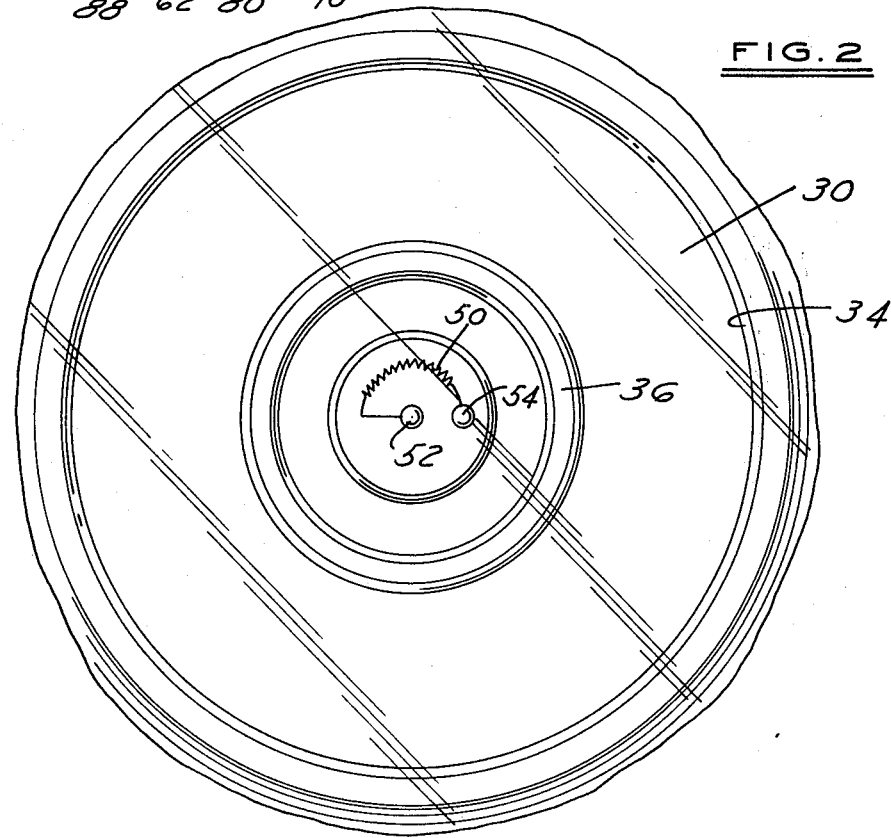

COOKING VESSEL TEMPERATURE CONTROL FOR MICROWAVE OVENS

This invention relates to a Cooking Vessel Temperature Control for Microwave Ovens and more particularly to a combination cooking vessel and oven wherein cooking temperature can be controlled through a temperature responsive means carried by the cooking vessel.

In checking cooking temperatures in gas or electric ovens, it has been known to control the ambient temperature in the oven and as a function of time estimate the total cooking time required. In other instances, thermometer probes have been inserted into a roast or dish to detect the internal temperature.

With the increasing use of microwave ovens for fast cooking, a thermocouple carried on the end of a resilient cable has been used, this being in the cooking vessel to detect the temperature and become part of the control circuit. This has not been a satisfactory solution because the probe is difficult to keep clean and it may not be properly located in the food or food vessel thereby giving inconsistent results.

The present invention contemplates a heat sensitive means which can be permanently located in the wall of a cooking vessel where it can become a part of a control system.

It is an object of the invention to provide a control system for a microwave oven which will provide consistent heat control at all times. It is a further object to provide a control system which automatically functions to connect and disconnect into a control circuit. A still further object is the provision of a dish design which cooperates to distribute heat in a vessel to insure even heating and cooking.

Other objects and features of the invention relate to details of construction and operation as will be disclosed in the following description and claims in which the invention is described together with details to enable a person skilled in the art to utilize the invention, all in connection with the best mode presently contemplated for the practice of the invention.

Figure 5:
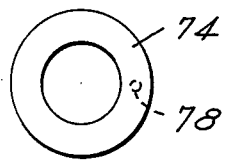
Figure 6:
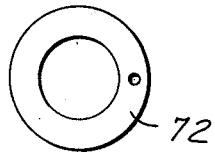
Figure 4:
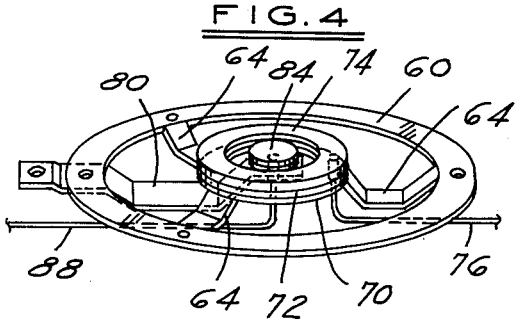
Figure 8:
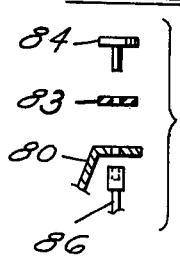
Figure 7:
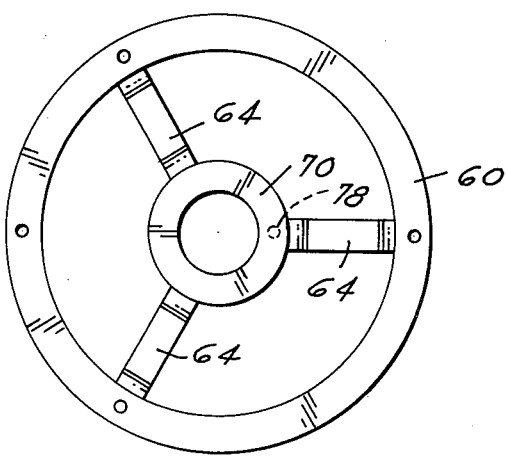

DRAWINGS accompany the disclosure and the various views thereof may be briefly described as:

FIG. 1, a sectional view of a cooking vessel assembly illustrating the invention.
FIG. 2, a bottom view of a cooking vessel.
FIG. 3, a plan view of an oven base.
FIG. 4, a perspective view of a connection assembly.
FIG. 5, a plan view of a contact ring.
FIG. 6, a plan view of an insulator ring.
FIG. 7, a plan view of a spider ring.
FIG. 8, an exploded view of a center contact button.

REFERRING TO THE DRAWINGS, in FIG. 1, in the sectional view, is a microwave oven base 20 of standard construction which would extend to standard size walls and back wall with a suitable top and door.

The bottom 20 has a circular opening 22 surrounded by a raised circular locating boss 24 spaced outwardly from the periphery of the hole.

A vessel 30 formed of a material, such as glass, has a bottom 32 with a supporting flange 34 and a downwardly extending circular boss 36 of slightly smaller diameter than boss 24 so that two bosses interfit to locate the vessel relative to the hole 22.

The vessel 30 has a cover 40 with a raised crown rim 42 which will support a second vessel 44 if desired. The glass walls and cover have depressed concave lens formation 46 which cause microwaves to diffuse into the vessel to provide an evenly distributed temperature in the contents of the vessel when the waves of energy are activated.

A temperature responsive means in the form of a 50 as shown in FIG. 2, or a thermocouple (not shown), is embedded in the central bottom area of vessels 30 and 44, each end having a terminal button projecting from and exposed at the bottom of the vessel. One end terminates at a button 52 centrally of the vessel and the other end terminates at a button 54 spaced from the center. These buttons serve as contacts for registering contacts of a control circuit now to be described.

A ring 60 (FIGS. 4 and 7) is apertured to be secured to the bottom wall 20 of the microwave oven by screws 62. This ring has resilient arms 64 secured thereto and extending inwardly to an inner ring 70 which is raised above the level of ring 60 to lie within the hole 22 of the oven bottom 20. An insulating ring 72 (FIG. 6) overlies ring 70 and a conductive contact ring 74 (FIG. 5) positions atop the insulating ring. A connection wire 76 has a terminal 78 which is conductively joined to contact ring 74, this wire leading to a control circuit for the oven. These rings 70, 72 and 74 are suitably secured together by heat resistant adhesives or other mechanical means.

A resilient radial bracket arm 80 (FIG. 4), secured to the bottom 20 by screws 62 and 82, extends to the center of ring 70 and upwardly to the level of ring 70. The free end of this arm carries an insulator washer 83 (FIG. 8) and a contact button 84 which has a shank fitting a terminal 86 on a lead 88 in the control circuit of the oven.

As viewed in assembly cross-section in FIG. 1, if the vessel 30 is lifted, the contact ring 74 will be in a slight higher position than shown because of the normal position of resilient arms 64. Similarly, the contact button 74 will be slightly higher because of the position of bracket 80. When the vessel is lowered into place, the central contact 52 will strike contact button 84, and the outer contact 54 will strike contact ring 74. This brings the thermoresistor 50 into the microwave oven control circuit as long as the vessel is in place in the oven.

Thus, the locator rings will properly center a vessel placed in the oven and regardless of the circumferential orientation of the vessel, the central contact 52 and the contact 54 will always be in conductive relation to center control contact 84 and ring contact 74.

A standard thermoresistor or thermocouple control circuit can be utilized for setting various temperatures desired and since the microwave energy is directed through the walls of the vessel, the thermoresistor 50 is in a good location to register heat in the vessel. Thus, the food need not be touched by the control.

What I claim is:
1. A control for microwave cooking which comprises:
    (a) a vessel,
    (b) a temperature responsive means carried by the wall of said vessel,
    (c) a plurality of spaced contacts on the wall of said vessel connected to said temperature responsive means,
    (d) a microwave oven and spaced contact means in a microwave oven control circuit, and

(e) means mounting said spaced contact means adjacent an oven wall to register with said contacts on said vessel to incorporate said temperature responsive means into a control circuit when said vessel is positioned in said microwave oven.

2. A control as defined in claim 1 in which said temperature responsive means is embedded in the bottom wall of a vessel and said spaced contacts are exposed on an outer wall of the vessel.

3. A control as defined in claim 2 in which said spaced contact means in said microwave oven control circuit comprise a contact ring and a button contact located within said ring.

4. A control as defined in claim 3 in which said contact ring and said button contact are resiliently mounted.

5. A control as defined in claim 2 in which said spaced contacts and said contact means are resiliently biased toward each other when said vessel is in place.

6. A control as defined in claim 1 in which means is provided on said vessel and means is provided in said oven to locate said vessel in proper position for registry of said contacts and said contact means.

7. In combination,
(a) a microwave oven having an apertured bottom wall,
(b) a ring mounted on said wall having resilient radial arms extending inwardly and upwardly into a space below said aperture,
(c) a conductive contact ring mounted on said arms in said aperture,
(d) a bracket support having a free end extending to the center of said rings,
(e) a conductive contact on said free end within said conductive contact ring,
(f) a cooking vessel,
(g) a thermocouple embedded in the bottom of said vessel, and
(h) spaced contacts extending to the outer face of said vessel wall positioned to contact respectively said conductive contact ring and said conductive contact.

8. A combination as defined in claim 7 in which means is provided on said vessel and means is provided on said wall to locate said vessel in proper position for registering said contacts and said contact means.

* * * * *